US011509378B2

(12) United States Patent
Ota et al.

(10) Patent No.: US 11,509,378 B2
(45) Date of Patent: Nov. 22, 2022

(54) APPARATUS SEARCH FOR OPTIMAL DIRECTIONAL BEAMS

(71) Applicant: NIPPON TELEGRAPH AND TELEPHONE CORPORATION, Tokyo (JP)

(72) Inventors: Atsushi Ota, Musashino (JP); Naoki Kita, Musashino (JP); Yushi Shirato, Musashino (JP); Yutaka Imaizumi, Musashino (JP); Kazuto Goto, Musashino (JP); Chunhsiang Huang, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 115 days.

(21) Appl. No.: 17/043,383

(22) PCT Filed: Mar. 19, 2019

(86) PCT No.: PCT/JP2019/011352
§ 371 (c)(1),
(2) Date: Sep. 29, 2020

(87) PCT Pub. No.: WO2019/188551
PCT Pub. Date: Oct. 3, 2019

(65) Prior Publication Data
US 2021/0099217 A1 Apr. 1, 2021

(30) Foreign Application Priority Data
Mar. 30, 2018 (JP) .............................. JP2018-069708

(51) Int. Cl.
H04B 7/06 (2006.01)
H04B 7/0408 (2017.01)
(Continued)

(52) U.S. Cl.
CPC ......... *H04B 7/0695* (2013.01); *H04B 7/0408* (2013.01); *H04B 7/0617* (2013.01); *H04B 7/086* (2013.01); *H04W 16/28* (2013.01)

(58) Field of Classification Search
CPC .. H04B 7/0695; H04B 7/0408; H04B 7/0617; H04B 7/086; H04B 7/088; H04W 16/28; H04W 88/02; H01Q 21/08; H01Q 3/26
See application file for complete search history.

(56) References Cited

U.S. PATENT DOCUMENTS

2004/0077379 A1\* 4/2004 Smith ................... H04W 16/10
455/562.1
2007/0195736 A1\* 8/2007 Taira .................... H04B 7/2643
370/335
(Continued)

FOREIGN PATENT DOCUMENTS

JP H11196023 A 7/1999
JP 2001160773 A 6/2001

OTHER PUBLICATIONS

Toru Takahashi, "Array Antenna", Knowledge Base Knowledge Forest, 2013, pp. 8-10. <http://www.ieice-hbkb.org/files/04/04gun_02hen_07.pdf>. Machine translation attached.
Nokia, Alcatel-Lucent Shanghai Bell, "On CSI-RS Design for DL Beam Management". 3GPP TSG RAN WG1 adhoc_NR_AH_1701 R1-1701102. Jan. 16, 2017. <http://www.3gpp.org/ftp/tsg_ran/WG1_RL1/TSGR1_AH/NR_AH_1701/Docs/R1-1701102.zip>.
(Continued)

*Primary Examiner* — Tejis Daya
(74) *Attorney, Agent, or Firm* — Harness, Dickey & Pierce, P.L.C.

(57) ABSTRACT

A wireless communication system which includes first and second wireless station apparatuses having a plurality of antenna elements and performs directivity forming. For $T_1$ and $T_2$ such that $T_2=N_2 \times T_0$ and $T_1=N_1 \times T_2$ with a predetermined period $T_0$, the wireless communication system per-
(Continued)

forms the steps of sequentially switching $N_1$ types of directional beams at intervals of period $T_2$ and transmitting signals while performing switching with an identical directional beam switching pattern maintained over period $T_1$, sequentially switching $N_2$ types of directional beams at intervals of period $T_0$ and receiving signals over the period $T_1$ or more while performing switching with an identical directional beam switching pattern maintained over the period $T_2$, searching for a directional beam having a highest reception level among those acquired over a predetermined period, and setting the searched directional beam as a directional beam to be used.

3 Claims, 7 Drawing Sheets

(51) Int. Cl.
*H04B 7/08* (2006.01)
*H04W 16/28* (2009.01)

(56) References Cited

U.S. PATENT DOCUMENTS

| | | | | |
|---|---|---|---|---|
| 2011/0273335 | A1* | 11/2011 | Gonikberg | H01Q 3/2605 |
| | | | | 342/423 |
| 2013/0286960 | A1* | 10/2013 | Li | H04B 7/0617 |
| | | | | 370/329 |
| 2019/0037530 | A1* | 1/2019 | Han | H04B 7/0695 |
| 2020/0067609 | A1* | 2/2020 | Kato | H04B 17/14 |

OTHER PUBLICATIONS

Samsung, "The Impact of Beam Sweeping on RRM Measurement". 3GPP TSG RAN WG2 #101 R2-1802449, Feb. 26, 2018. <https://www.3gpp.org/ftp/TSG_RAN/WG2_RL2/TSGR2_101/Docs/R2-1802449.zip>.

* cited by examiner

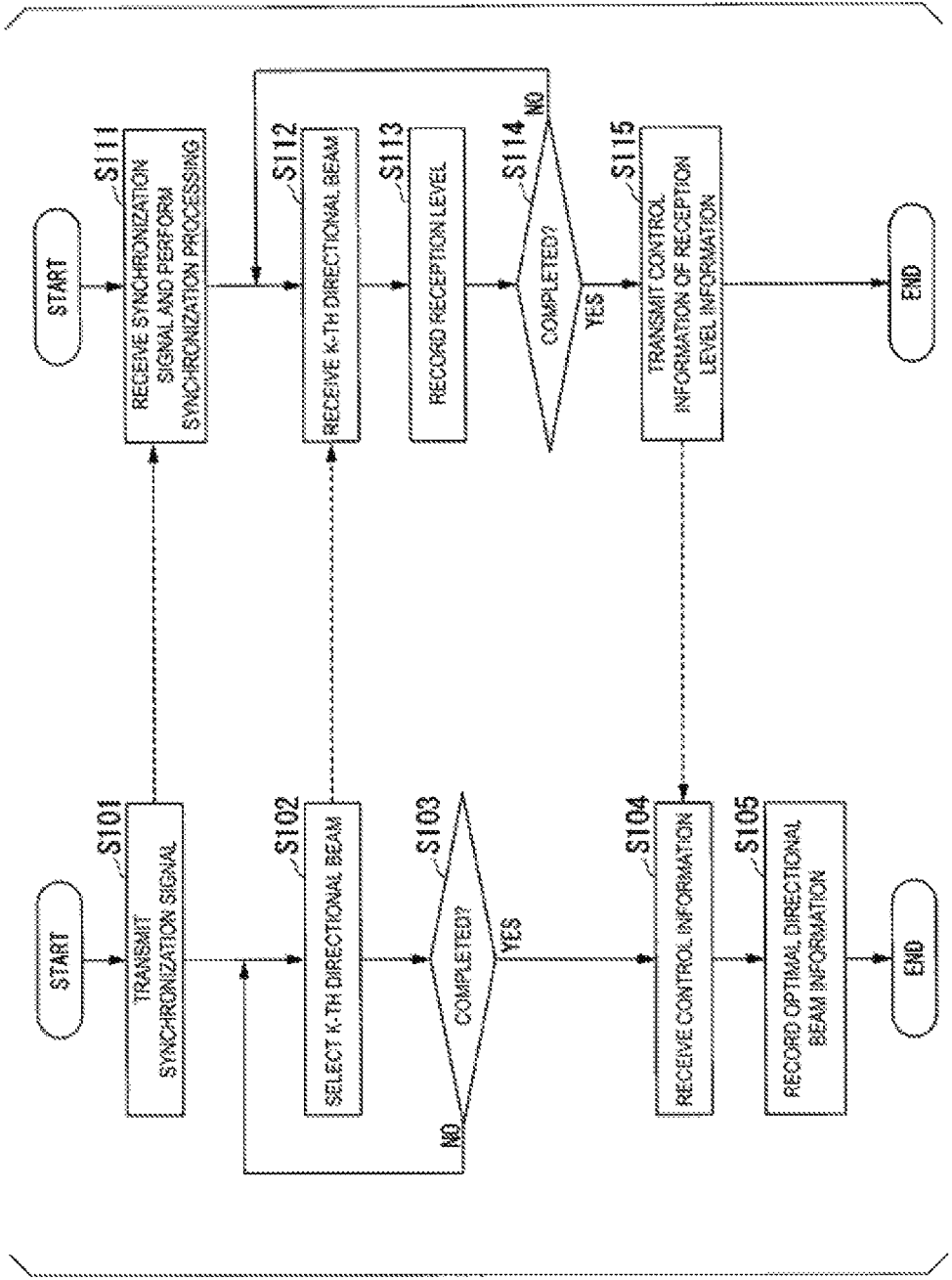

APPARATUS SEARCH FOR OPTIMAL DIRECTIONAL BEAMS

CROSS-REFERENCE TO RELATED APPLICATIONS

This application is a 371 U.S. National Phase of International Application No. PCT/JP2019/011352, filed on Mar. 19, 2019, which claims priority to Japanese Application No. 2018-069708 filed on Mar. 30, 2018. The entire disclosures of the above applications are incorporated herein by reference.

TECHNICAL FIELD

The present invention relates to a wireless communication method, a wireless communication system, and a wireless station apparatus.

BACKGROUND ART

In recent years, highly convenient frequency resources of microwave bands have been depleted with the explosive spread of smartphones. As a countermeasure, a shift from third-generation mobile phones to fourth-generation mobile phones and allocation of new frequency bands have been performed. However, frequency resources allocated to each operator are limited because there are many operators who want to provide services.

In mobile phone services, studies are underway to improve the efficiency of frequency utilization through a multi-antenna system that uses multiple antenna elements. In the Institute of Electrical and Electronics Engineers Inc. (IEEE) 802.11n which is a wireless standard that has already spread, spatial multiplexing transmission is performed using a multiple input multiple output (MIMO) transmission technique that uses a plurality of antenna elements for each of transmission and reception. This increases the transmission capacity and improves the efficiency of frequency utilization in IEEE 802.11n.

"MIMO" generally refers to a system in which a transmitting station and a receiving station both have a plurality of antenna elements. On the other hand, a system in which a transmitting station has a plurality of antenna elements and a receiving station has a single antenna element is generally called "multiple input single output (MISO)" rather than "MIMO." However, the system including that in which a transmitting station has a plurality of antenna elements and a receiving station has a single antenna element will be also referred to as "MIMO" in the following description.

Recent communication methods generally employ a scheme in which signal processing is performed in the frequency domain divided into a plurality of frequency components (subcarriers). Such schemes include, for example, an orthogonal frequency division multiplexing (OFDM) modulation scheme and a single carrier-frequency domain equalization (SC-FDE) scheme. In the following description, schemes in which signal processing is performed in the frequency domain divided into a plurality of frequency components (subcarriers) are collectively referred to as "subcarrier" without particularly distinguishing OFDM, SC-FDE, and the like from each other.

The most classic technique in antenna directivity control using a plurality of antenna elements is a technique called a phased array (for example, see NPL 1). The purpose of the phased array technology is to form directivity using a large number of antenna elements without assuming that spatial multiplexing transmission is performed. After that, the MIMO transmission technique described above in which a transmitting station and a receiving station both have a plurality of antenna elements and a plurality of signal sequences are spatially multiplexed and transmitted through the same frequency channel was developed. In a typical example of the MIMO transmission technique, two antenna elements are provided on each of the transmitting side and the receiving side, such that two signal sequences are spatially multiplexed. Here, the upper limit of the achievable spatial multiplexing number corresponds to the smaller of the number of antenna elements on the transmitting station and the number of antenna elements on the receiving station. In a general MIMO transmission technique, the same number of transmitting antennas and the same number of receiving antennas are provided as the desired spatial multiplexing number.

A massive MIMO (large-scale MIMO) transmission technique, which is a further development of the MIMO transmission technique described above, has attracted attention in recent years. In the massive MIMO transmission technique, a much larger number of redundant antenna elements than the actual spatial multiplexing number are implemented. In the massive MIMO transmission technique, a transmitting station and a receiving station each have multiple elements of antennas and synthesize transmission and reception signals from the antenna elements multiplied by predetermined weights (coefficients) to perform communication with an increased directivity gain in a predetermined direction.

Generally, in a multipath-rich environment, if the transmitting station and the receiving station both form appropriate directional beams in many directions, it is possible to realize spatial multiplexing transmission via transmission paths corresponding to the directional beams. In this multipath-rich environment, transmission and reception weights required to form a directivity gain are frequency-dependent and thus it is necessary to multiply transmission and reception signals by weights that are different for each frequency component.

However, if line-of-sight waves can be secured or stable reflected waves can be expected, analog signal processing can replace signal processing that provides directivity in the direction of arrival of radio waves when the radio waves are approximated by plane waves. Particularly, when digital signal processing is performed, there are problems that costs increase and power consumption increases because a large number of analog to digital (A/D) converters and digital to analog (D/A) converters are required. A general approach to solve these problems is to mount phase shifters on each antenna element to form directivity through analog processing.

In this case, phase rotations of plane waves due to path length differences between the antenna elements are canceled using the phase shifters, such that received signals at the antenna elements can be phase-aligned. This can increase the directivity gain. This signal processing is the same as that of the phased array technology described above.

Here, in a general mobile environment, the arrival direction of radio waves varies due to both movement of the terminal and changes in the external environment. Thus, both the transmitting side and the receiving side need to be synchronized and cooperate to determine the directions of directional beams. For example, according to the related art, U-plane user data and C-plane control information are transmitted using different frequency bands. Synchronization and cooperation are achieved using the C plane.

Further, a terminal station apparatus receives training signals (or test signals for beam search) of various directional beams transmitted from a base station apparatus in designated time slots. The terminal station apparatus returns information indicating the reception levels of received beams identified by some identification information or indicating some reception levels at which high gains are obtained, together with the identification information, to the base station apparatus. As a result, the base station apparatus can select a directional beam to be used for the terminal station apparatus.

Incidentally, a mechanism for continuing communication while maintaining synchronization even while the terminal moves with time is required for the system in the mobile environment described above. However, when a base station apparatus and a terminal station (relay station) apparatus are fixedly installed, for example, as in a wireless entrance system, conditions differ from those in the above mobile environment and thus it is possible to realize the above using a simpler mechanism.

CITATION LIST

Non Patent Literature

NPL 1: Toru Takahashi, "Knowledge Base: Forest of Knowledge, Group 4, Volume 2, Chapter 7, 'Array Antenna,' the Institute of Electronics, Information and Communication Engineers (IEICE), pp. 8-10, 2013, Internet <URL: http://www.ieice-hbkb.org/files/04/04gun_02hen_07.pdf>

SUMMARY OF THE INVENTION

Technical Problem

On the other hand, in such a system in the mobile environment, it is assumed that the U plane operates in a relatively low frequency band, but it is assumed in the case of wireless entrance that a higher frequency band is used. In the case of wireless entrance, for example, it is assumed that an E band of 70/80 GHz or the like is used and it is required that both the U plane and the C plane operate in this frequency band.

It is required that the U plane and the C plane operate in a high frequency band for directional beam selection in the wireless entrance system in which it is assumed that a high frequency band is used as described above. However, the base station apparatus and the terminal station apparatus are not synchronized at the start of communication. At this time, each of the base station apparatus and the terminal station apparatus cannot recognize at which timing and in which direction the other station has transmitted a beam. Further, there is a problem that a directional beam cannot be optimally selected because the control line (C plane) has not been set. It is necessary to search for an optimal combination of directional beams with a simpler configuration even in such a situation.

In view of the above circumstances, it is an object of the present invention to provide a wireless communication method, a wireless communication system, and a wireless station apparatus that can search for optimal directional beams even between apparatuses that are not synchronized.

Means for Solving the Problem

An aspect of the present invention provides a wireless communication method for a wireless communication system including a first wireless station apparatus having a plurality of antenna elements and a second wireless station apparatus having a plurality of antenna elements and allows the first wireless station apparatus and the second wireless station apparatus to perform directivity forming using the plurality of antenna elements, the first wireless station apparatus being able to form $N_1$ types of directional beams using the plurality of antenna elements (where $N_1$ is an integer of 2 or more), and the second wireless station apparatus being able to form $N_2$ types of directional beams using the plurality of antenna elements (where $N_2$ is an integer of 2 or more), wherein, for $T_1$ and $T_2$ such that $T_2=N_2 T_0$ and $T_1=N_1 \times T_2$ with $T_0$ being a predetermined period that is a double or more of a time required to detect a reception level in the first wireless station apparatus and the second wireless station apparatus, the methods includes, at the first wireless station apparatus, a transmitting step of sequentially switching $N_1$ types of directional beams at intervals of a period $T_2$ and transmitting training signals for reception level detection while performing switching with an identical directional beam switching pattern maintained over a period $T_1$, and, at the second wireless station apparatus, a first receiving step of sequentially switching $N_2$ types of directional beams at intervals of a period $T_0$ and receiving training signals for reception level detection over at least the period $T_1$ or more while performing switching with an identical directional beam switching pattern maintained over the period $T_2$, a reception level acquiring step of acquiring reception levels of the received training signals, a first search step of searching for an identification number of a directional beam having a highest reception level in reception level information acquired over a predetermined period, and a first setting step of setting the directional beam having the highest reception level based on the searched identification number as a directional beam used at times of transmission and reception.

Another aspect of the present invention provides a wireless communication system including a first wireless station apparatus having a plurality of antenna elements and a second wireless station apparatus having a plurality of antenna elements and allows the first wireless station apparatus and the second wireless station apparatus to perform directivity forming using the plurality of antenna elements, the first wireless station apparatus being able to form $N_1$ types of directional beams using the plurality of antenna elements (where $N_1$ is an integer of 2 or more), and the second wireless station apparatus being able to form $N_2$ types of directional beams using the plurality of antenna elements (where $N_2$ is an integer of 2 or more), wherein, for $T_1$ and $T_2$ such that $T_2=N_2 T_0$ and $T_1=N_1 \times T_2$ with $T_0$ being a predetermined period that is a double or more of a time required to detect a reception level in the first wireless station apparatus and the second wireless station apparatus, the first wireless station apparatus includes a transmitting unit configured to sequentially switch $N_1$ types of directional beams at intervals of a period $T_2$ and transmit training signals for reception level detection while performing switching with an identical directional beam switching pattern maintained over a period $T_1$, and the second wireless station apparatus includes a receiving unit configured to sequentially switch $N_2$ types of directional beams at intervals of a period $T_0$ and receive training signals for reception level detection over at least the period $T_1$ or more while performing switching with an identical directional beam switching pattern maintained over the period $T_2$, a reception level acquiring unit configured to acquire reception levels of the received training signals, a search unit configured to search for an identification number of a directional beam having a highest reception level in reception level information acquired over a predetermined period, and a setting unit configured to set the directional beam having the highest reception level based on the searched identification number as a directional beam used at times of transmission and reception.

Another aspect of the present invention provides a wireless station apparatus that is able to form $N_2$ types of directional beams using a plurality of second antenna elements (where $N_2$ is an integer of 2 or more) to perform directivity forming with another wireless station apparatus that is able to form $N_1$ types of directional beams using a plurality of first antenna elements (where $N_1$ is an integer of 2 or more), wherein, for $T_1$ and $T_2$ such that $T_2=N_2 \times T_0$ and $T_1=N_1 \times T_2$ with $T_0$ being a predetermined period that is a double or more of a time required to detect a reception level in the wireless station apparatus and the other wireless station apparatus, the wireless station apparatus includes a receiving unit configured to sequentially switch $N_2$ types of directional beams at intervals of a period $T_0$ and receive training signals for reception level detection over at least a period $T_1$ or more while performing switching with an identical directional beam switching pattern maintained over a period $T_2$, a reception level acquiring unit configured to acquire reception levels of the received training signals, a search unit configured to search for an identification number of a directional beam having a highest reception level in reception level information acquired over a predetermined period, and a setting unit configured to set the directional beam having the highest reception level based on the searched identification number as a directional beam used at times of transmission and reception.

Another aspect of the present invention provides a wireless station apparatus that is able to form $N_2$ types of directional beams using a plurality of second antenna elements (where $N_2$ is an integer of 2 or more) to perform directivity forming with another wireless station apparatus that is able to form $N_1$ types of directional beams using a plurality of first antenna elements (where $N_1$ is an integer of 2 or more), wherein, for $T_1$ and $T_2$ such that $T_2=N_2 \times T_0$ and $T_1=N_1 \times T_2$ with $T_0$ being a predetermined period that is a double or more of a time required to detect a reception level in the wireless station apparatus and the other wireless station apparatus, the wireless station apparatus includes a receiving unit configured to sequentially switch $N_2$ types of directional beams at intervals of a period $T_0$ and receive training signals for reception level detection over a period that is a double or more of a period $T_1$ while performing switching with an identical directional beam switching pattern maintained over a period $T_2$, a reception level acquiring unit configured to acquire reception levels of the received training signals, a search unit configured to search for an identification number of a directional beam having a highest reception level in reception level information acquired in the period $T_1$ and search for a directional beam having a maximum count number among count numbers of directional beams counted by a counting unit configured to count the number of times each directional beam is selected as a directional beam having a highest reception level, and a setting unit configured to set the searched directional beam having the maximum count number as a directional beam used at times of transmission and reception.

Another aspect of the present invention provides a wireless station apparatus that is able to form $N_2$ types of directional beams using a plurality of second antenna elements (where $N_2$ is an integer of 2 or more) to perform directivity forming with another wireless station apparatus that is able to form $N_1$ types of directional beams using a plurality of first antenna elements (where $N_1$ is an integer of 2 or more), wherein, for $T_1$ and $T_2$ such that $T_2=N_2 \times T_0$ and $T_1=N_1 \times T_2$ with $T_0$ being a predetermined period that is a double or more of a time required to detect a reception level in the wireless station apparatus and the other wireless station apparatus, the wireless station apparatus includes a receiving unit configured to sequentially switch $N_2$ types of directional beams at intervals of a period $T_0$ and receive training signals for reception level detection over a period that is a double or more of a period $T_1$ while performing switching with an identical directional beam switching pattern maintained over a period $T_2$, a reception level acquiring unit configured to acquire reception levels of the received training signals, a recording unit configured to record, for each directional beam used for reception, all or part of reception level information acquired over the predetermined period, an average value calculating unit configured to calculate an average value of reception levels recorded by the recording unit for each directional beam, a search unit configured to search for an identification number of a directional beam having a highest reception level in the reception level information calculated by the average value calculating unit, and a setting unit configured to set the searched directional beam having the maximum average value of reception levels as a directional beam used at times of transmission and reception.

Another aspect of the present invention provides a wireless communication method for a wireless communication system including a first wireless station apparatus having a plurality of antenna elements and a second wireless station apparatus having a plurality of antenna elements and allows the first wireless station apparatus and the second wireless station apparatus to perform directivity forming using the plurality of antenna elements, the first wireless station apparatus being able to form $N_1$ types of directional beams using the plurality of antenna elements (where $N_1$ is an integer of 2 or more), and the second wireless station apparatus being able to form $N_2$ types of directional beams using the plurality of antenna elements (where $N_2$ is an integer of 2 or more), wherein, for $T_1$ and $T_2$ such that $T_1=N_1 \times T_0$ and $T_2=N_2 \times T_1$ with $T_0$ being a predetermined period that is a double or more of a time required to detect a reception level in the first wireless station apparatus and the second wireless station apparatus, the method includes, at the first wireless station apparatus, a transmitting step of sequentially switching $N_1$ types of directional beams at intervals of a period $T_0$ and transmitting training signals for reception level detection while performing switching with an identical directional beam switching pattern maintained over a period $T_1$, and, at the second wireless station apparatus, a first receiving step of sequentially switching $N_2$ types of directional beams at intervals of the period $T_1$ and receiving training signals for reception level detection over at least a period $T_2$ or more while performing switching with an identical directional beam switching pattern maintained over the period $T_2$, a reception level acquiring step of acquiring reception levels of the received training signals, a first search step of searching for an identification number of a directional beam having a highest reception level in reception level information acquired over a predetermined period, and a first setting step of setting the directional beam having the highest reception level based on the searched identification number as a directional beam used at times of transmission and reception.

Another aspect of the present invention provides a wireless communication system which includes a first wireless station apparatus having a plurality of antenna elements and a second wireless station apparatus having a plurality of antenna elements and allows the first wireless station apparatus and the second wireless station apparatus to perform directivity forming using the plurality of antenna elements, the first wireless station apparatus being able to form $N_1$ types of directional beams using the plurality of antenna elements (where $N_1$ is an integer of 2 or more), and the second wireless station apparatus being able to form $N_2$ types of directional beams using the plurality of antenna elements (where $N_2$ is an integer of 2 or more), wherein, for $T_1$ and $T_2$ such that $T_1=N_1 \times T_0$ and $T_2=N_2 \times T_1$ with $T_0$ being a predetermined period that is a double or more of a time required to detect a reception level in the first wireless station apparatus and the second wireless station apparatus, the first wireless station apparatus includes a transmitting unit configured to sequentially switch $N_1$ types of directional beams at intervals of a period $T_0$ and transmit training signals for reception level detection while performing switching with an identical directional beam switching pattern maintained over a period $T_1$, and the second wireless station apparatus includes a receiving unit configured to sequentially switch $N_2$ types of directional beams at intervals of the period $T_1$ and receive training signals for reception level detection over at least a period $T_2$ or more while performing switching with an identical directional beam switching pattern maintained over the period $T_2$, a reception level acquiring unit configured to acquire reception levels of the received training signals, a search unit configured to search for an identification number of a directional beam having a highest reception level in reception level information acquired over a predetermined period, and a setting unit configured to set the directional beam having the highest reception level based on the searched identification number as a directional beam used at times of transmission and reception.

Another aspect of the present invention provides a wireless station apparatus that is able to form $N_2$ types of directional beams using a plurality of second antenna elements (where $N_2$ is an integer of 2 or more) to perform directivity forming with another wireless station apparatus that is able to form $N_1$ types of directional beams using a plurality of first antenna elements (where $N_1$ is an integer of 2 or more), wherein, for $T_1$ and $T_2$ such that $T_1=N_1 \times T_0$ and $T_2=N_2 \times T_1$ with $T_0$ being a predetermined period that is a double or more of a time required to detect a reception level in the wireless station apparatus and the other wireless station apparatus, the wireless station apparatus includes a receiving unit configured to sequentially switch $N_2$ types of directional beams at intervals of a period $T_1$ and receive training signals for reception level detection over at least a period $T_2$ or more while performing switching with an identical directional beam switching pattern maintained over the period $T_2$, a reception level acquiring unit configured to acquire reception levels of the received training signals, a search unit configured to search for an identification number of a directional beam having a highest reception level in reception level information acquired over a predetermined period, and a setting unit configured to set the directional beam having the highest reception level based on the searched identification number as a directional beam used at times of transmission and reception.

Another aspect of the present invention provides a wireless station apparatus that is able to form $N_2$ types of directional beams using a plurality of second antenna elements (where $N_2$ is an integer of 2 or more) to perform directivity forming with another wireless station apparatus that is able to form $N_1$ types of directional beams using a plurality of first antenna elements (where $N_1$ is an integer of 2 or more), wherein, for $T_1$ and $T_2$ such that $T_1=N_1 \times T_0$ and $T_2=N_2 \times T_1$ with $T_0$ being a predetermined period that is a double or more of a time required to detect a reception level in the wireless station apparatus and the other wireless station apparatus, the wireless station apparatus includes a receiving unit configured to sequentially switch $N_2$ types of directional beams at intervals of a period $T_1$ and receive training signals for reception level detection over a period that is a double or more of a period $T_2$ while performing switching with an identical directional beam switching pattern maintained over the period $T_2$, a reception level acquiring unit configured to acquire reception levels of the received training signals, a search unit configured to search for an identification number of a directional beam having a highest reception level in reception level information acquired in the period $T_2$ and search for a directional beam having a maximum count number among count numbers of directional beams counted by a counting unit configured to count the number of times each directional beam is selected as a directional beam having a highest reception level, and a setting unit configured to set the searched directional beam having the maximum count number as a directional beam used at times of transmission and reception.

Another aspect of the present invention provides a wireless station apparatus that is able to form $N_2$ types of directional beams using a plurality of second antenna elements (where $N_2$ is an integer of 2 or more) to perform directivity forming with another wireless station apparatus that is able to form $N_1$ types of directional beams using a plurality of first antenna elements (where $N_1$ is an integer of 2 or more), wherein, for $T_1$ and $T_2$ such that $T_1=N_1 \times T_0$ and $T_2=N_2 \times T_1$ with $T_0$ being a predetermined period that is a double or more of a time required to detect a reception level in the wireless station apparatus and the other wireless station apparatus, the wireless station apparatus includes a receiving unit configured to sequentially switch $N_2$ types of directional beams at intervals of a period $T_1$ and receive training signals for reception level detection over a period that is a double or more of a period $T_2$ while performing switching with an identical directional beam switching pattern maintained over the period $T_2$, a reception level acquiring unit configured to acquire reception levels of the received training signals, a recording unit configured to record, for each directional beam used for reception, all or part of reception level information acquired over the predetermined period, an average value calculating unit configured to calculate an average value of reception levels recorded by the recording unit for each directional beam, a search unit configured to search for an identification number of a directional beam having a highest reception level in the reception level information calculated by the average value calculating unit, and a setting unit configured to set the searched directional beam having the maximum average value of reception levels as a directional beam used at times of transmission and reception.

Effects of the Invention

According to the present invention, it is possible to search for optimal directional beams even between apparatuses that are not synchronized.

BRIEF DESCRIPTION OF DRAWINGS

FIGS. 2A and 2B are flowcharts showing flows of directional beam search processing according to the related art.

DESCRIPTION OF EMBODIMENTS

First, to facilitate the description of a wireless communication method, a wireless communication system, and a wireless station apparatus according to the present invention, an outline of a phased array and a flow of directional beam search processing according to the related art will be described.

Figure 1:
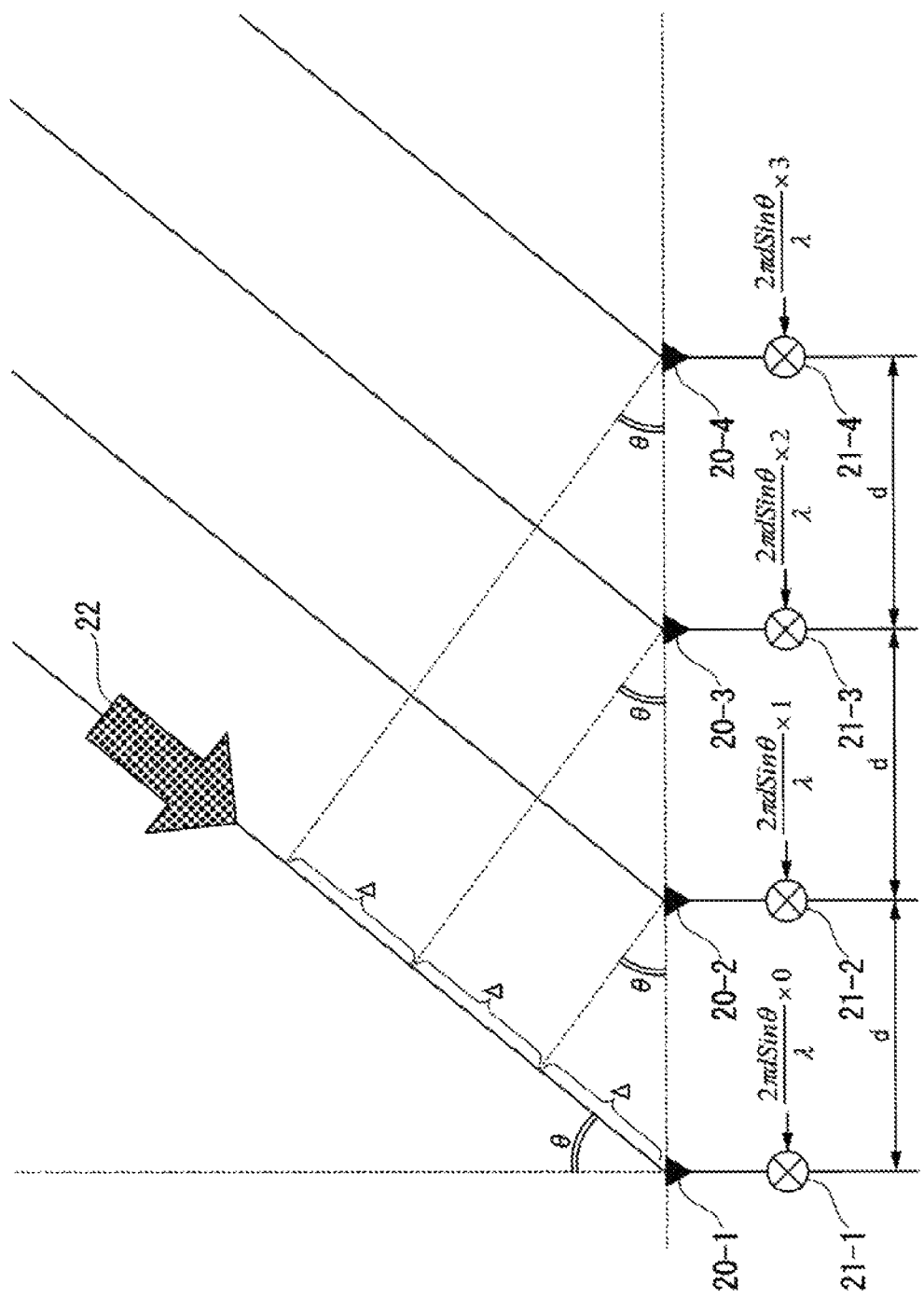
FIG. 1 is a diagram showing an outline of a phased array according to the related art.

FIG. 1 is a diagram showing an outline of a phased array according to the related art. In FIG. 1, reference signs 20-1 to 20-4 indicate antenna elements. Reference signs 21-1 to 21-4 indicate phase shifters. Reference sign 22 is an arrow indicating the direction of arrival of radio waves. Here, the case of a linear array in which antenna elements are arranged one-dimensionally at antenna element intervals d will be described for the sake of simplicity of description.

When the antenna elements 20-1 to 20-4 receive radio waves in the arrival direction 22 (at an incident angle θ), there are path length differences of dSinθ between the elements if plane wave approximation is performed assuming a line-of-sight environment. As shown in FIG. 1, the path length decreases as the number of the suffix ("1" to "4") of the reference sign of the antenna element 20-1 to 20-4 increases.

Here, when the wavelength of incoming waves is k, complex phase rotations of −2πxdSinθ/λ, occur between the antenna elements due to the path length differences described above. For example, with respect to the antenna element 20-1 as a reference, the antenna element 20-2 has a complex phase difference of −2πxdSinθ/λ×1, the antenna element 20-3 has a complex phase difference of −2πxdSinθ/λ×2, . . . and the antenna element 20-k has a complex phase difference of −2πxdSinθ/λ×(k−1).

To receive all incoming waves in phase, it is necessary to cancel the complex phase differences. To cancel the complex phase differences, it is only required that a complex phase rotation of 2πxdSinθ/λ×0 be applied to a received signal at the antenna element 20-1, a complex phase rotation of 2πxdSinθ/λ×1 be applied to a received signal at the antenna element 20-2, a complex phase rotation 2πxdSinθ/λ×2 be applied to a received signal at the antenna element 20-3, . . . , and a complex phase rotation of 2πxdSinθ/λ×(k−1) be applied to a received signal at the antenna element 20-k.

In general, application of such complex phase rotations can be realized using phase shifters of analog circuits. Thus, if settings of applying the above phase rotations are performed on the phase shifters 21-1 to 21-4, a directivity gain in the arrival direction 22 can be increased by combining outputs from the phase shifters 21-1 to 21-4. If the element intervals d and the arrival direction are known in advance, it is possible to stably achieve the directivity gain in the arrival direction by setting such values in advance.

Hereinafter, directional beam search processing in a mobile environment according to the related art will be described.

FIGS. 2A and 2B are flowcharts showing flows of directional beam search processing according to the related art. Here, it is assumed that a C-plane line for communicating control information has been set in advance between a base station apparatus and a terminal station apparatus. Search processing that will be described below is processing of searching for an orientation for forming directivity for communication of a U-plane having a larger transmission capacity.

FIG. 2A shows processing on the base station apparatus side. FIG. 2B shows processing on the terminal station apparatus side.

Upon starting the search processing, the base station apparatus transmits a synchronization signal in the C plane. (step S101). Thereafter, the base station apparatus selects a k-th directional beam ($1 \leq k \leq N_{bsmax}$) from $N_{bsmax}$ types of directional beams that can be selected in predetermined time slots (or frequency components) (step S102). The base station apparatus transmits a training signal using the selected k-th directional beam ($1 \leq k \leq N_{bsmax}$).

The number of types of directional beams transmitted here may be one or may be any number of types from two to $N_{bsmax}$. It is assumed that the terminal station apparatus side can identify which directional beam has been transmitted from the training signals or from notification information provided through control information of the C plane. For example, if time slots have been set in a predetermined format in the U plane, the base station apparatus may be configured to sequentially transmit directional beams to the terminal station apparatus while notifying the terminal station apparatus of which directional beams have been used in which time slots through control information of the C plane.

Alternatively, for example, when communication is performed using a plurality of sub-arrays, the base station apparatus may be configured to perform segregation on training signals transmitted through sub-arrays such that they do not overlap in the frequency domain and to notify the terminal station apparatus through the C plane of which directional beam corresponds to which frequency component. Alternatively, the terminal station apparatus may be configured such that the correspondence between frequency components and directional beams can be identified based on known conditions in the system.

In any case, it is assumed here that the terminal station apparatus can recognize which directional beam transmitted by the base station apparatus is the directional beam having the maximum reception level at the terminal station apparatus.

When at least one of the transmissions of directional beams from the base station apparatus has not been completed (No in step S103), the base station apparatus continuously repeats the subsequent process described above (that is, the process of step S102). When the transmissions of all directional beams from the base station apparatus have been completed (Yes in step S103), the base station apparatus waits to receive a control signal from the terminal station apparatus and finally receives the control signal (step S104). Based on information described in the control signal, the base station apparatus identifies an optimal directional beam for the terminal station apparatus and records the identified information (step S105). Thereafter, the base station apparatus terminates the processing.

On the other hand, upon starting the search processing, the terminal station apparatus receives the synchronization signal transmitted from the base station apparatus and performs synchronization processing (step S111). After performing the synchronization processing, the terminal station apparatus receives training signals, which the base station apparatus has sequentially transmitted using $N_{bsmax}$ types of directional beams, in predetermined time slots (or frequency components) (step S112).

The terminal station apparatus can identify which directional beam has been transmitted from the training signals or from the notification information provided through the control information of the C plane as described above. The terminal station apparatus records reception levels for known identification numbers of directional beams (step S113).

When at least one of the receptions of directional beams transmitted by the base station apparatus has not been completed (No in step S114), the above processing (that is, the processes of steps S112 to S113) is repeated. When all receptions of directional beams transmitted by the base station apparatus have been completed (Yes in step S114), the terminal station apparatus generates control information in which relationships between the identification numbers of the directional beams of the received training signals and the reception levels are recorded. The terminal station apparatus transmits the generated control information to the base station apparatus (step S115).

Thereafter, the terminal station apparatus terminates the processing.

Note that the control information of which the terminal station apparatus notifies the base station apparatus does not necessarily need to contain information on the reception levels of all directional beams. For example, a configuration may be provided such that the control information contains information on only the directional beam of the maximum reception level or only a small number of directional beams including that of the maximum reception level. The base station apparatus may also be configured to collect information on an optimal directional beam formed on the terminal station apparatus side together upon receiving a training signal.

In the directional beam search processing according to the related art, the base station apparatus and the terminal station apparatus need to be synchronized in the C plane as described above. In addition, the terminal station apparatus needs to be able to recognize which time slots or frequency components the base station apparatus has transmitted training signals through. Further, it is assumed that a minimum necessary communication function is provided before a directional beam is selected because the terminal station apparatus needs to return control information to the base station apparatus.

Hereinafter, preconditions common to embodiments of the present invention will be described.

First, as a first precondition, it is assumed that two wireless station apparatuses select an optimal combination of directional beams from a plurality of options of fixed beams. It is also assumed that the processing described below in which the two wireless station apparatuses select an optimal combination of directional beams from the options of fixed beams is performed in either case where wireless communication functions of the two wireless station apparatuses are "available" or "unavailable" before the optimal directional beams are selected.

Here, "available" indicates, for example, the case where a system which has a line design that can secure minimum communication even with an omni-directional beam is used. In such a system, communication in the C plane can be performed using a robust transmission mode such as binary phase shift keying (BPSK) even if directivity gains based on directional beams have not been secured. In this case, it is possible not only to exchange control information but also to achieve synchronization between the two wireless stations.

Alternatively, "available" refers to, for example, the case where the configuration is such that a system which uses a wireless standard different from that of the system assumed here is used together to perform communication.

In this case, in a state before directivity formation is performed, the base station apparatus can instruct the terminal station apparatus to perform directional beam selection processing using the wireless communication function described above. In this case, control information exchange itself can be performed, but it should be considered that the two wireless stations are basically not synchronized if their wireless standards are completely independent.

On the other hand, "unavailable" mentioned above refers to, for example, the case where a worker who installs a wireless station apparatus gives a trigger to start processing using a mobile phone, a transceiver, or the like.

In any case, it is assumed here that the receiving-side wireless station apparatus can acquire the start timing of the processing described below by some means.

Next, as a second precondition, it is assumed that the two wireless station apparatuses may have symmetric configurations or may have asymmetric configurations. The numbers of options for directional beams of the two opposing wireless station apparatuses are the same when the two wireless station apparatuses have symmetric configurations. The numbers of options for directional beams of the two opposing wireless station apparatuses may differ when the two wireless station apparatuses have asymmetric configurations.

The following description refers to the case where the two wireless station apparatuses have asymmetric configurations, assuming that the number of directional beams of the base station apparatus is $N_1$ and the number of directional beams of the terminal (relay) station apparatus is $N_2$. It is also assumed that one of the base station apparatus and the terminal station apparatus can recognize the number of options for directional beams of the other.

Hereinafter, $T_0$, $T_1$, and $T_2$ will be defined as variables used in reception level detection processing that the two wireless station apparatuses perform when selecting directional beams. $T_0$ is a predetermined period having a length of a double or more of the time required to detect a reception level (strictly speaking, if the time required for antenna directivity switching cannot be ignored, $T_0$ may be a time taking into consideration also the switching time). On the other hand, $T_1$ and $T_2$ are defined by the following Formulas (2) and (1), respectively.

$$T_2 = N_2 \times T_0 \tag{1}$$

$$T_1 = N_1 \times T_2 \tag{2}$$

Hereinafter, processing of selecting an optimal directional beam from the options for directional beams will be described.

First, one of the base station apparatus and the terminal station apparatus starts continuous transmission of training signals for testing (hereinafter referred to as "continuous transmission") upon receiving some trigger to start processing. On the other hand, the other of the base station apparatus and the terminal station apparatus starts continuous reception of training signals for testing (hereinafter referred to as "continuous reception").

Note that the triggers of the base station apparatus and the terminal station apparatus do not need to be synchronized and it is only required that the trigger to start the continuous reception of training signals for testing be later in time than the trigger to start the continuous transmission of training signals for testing and the two apparatuses are given a predetermined time secured to perform processing.

For example, when training signals are continuously transmitted from the terminal station apparatus to the base station apparatus, the $N_2$ options for directional beams are sequentially switched at intervals of the time $T_0$ while the training signals are transmitted. As a result, the options for directional beams are switched one cycle over the period $T_2$ and this processing is repeated for a predetermined time. Similarly, the base station apparatus on the other side performs continuous reception of training signals upon receiving some trigger to start processing.

When training signals transmitted from the terminal station apparatus are continuously received by the base station apparatus, the $N_1$ options for directional beams are sequentially switched at intervals of the time $T_2$ while the training signals are received. As a result, the options for directional beams are switched one cycle over the period $T_1$ and this processing is repeated for a predetermined time.

Here, the period $T_1$ is $N_1 \times N_2$ times the period $T_0$ which is the period at intervals of which the terminal station apparatus switches directional beams. Thus, if the base station apparatus continues to detect reception levels for the time $T_1$ while it is ensured that the terminal station apparatus continuously transmits training signals for testing, the base station apparatus can, during that time, reliably detect a reception level when using an optimal directional beam of the base station apparatus for a directional beam selected by the terminal station apparatus.

At this time, the base station apparatus cannot recognize which transmission beam the terminal station apparatus has used. However, the base station apparatus only needs to determine a directional beam to be used for transmission and reception by itself, and does not need information on the terminal station apparatus.

Next, similar to the above processing, the base station apparatus which has been able to select a directional beam to be used for transmission and reception starts continuous transmission of training signals for testing upon receiving some trigger to start processing. This continuous transmission is performed with the selected directional beam fixed. On the other hand, the terminal station apparatus starts continuous reception of training signals for testing.

Note that the triggers of the base station apparatus and the terminal station apparatus do not need to be synchronized and it is only required that the two apparatuses are given a predetermined time secured to perform processing.

At this time, the $N_2$ options for directional beams are sequentially switched at intervals of the time $T_0$ while the training signals are continuously received by the terminal station apparatus, similar to the above case at the time of transmission. As a result, the options for directional beams are switched one cycle over the period $T_2$ and this processing is repeated for a predetermined time.

Here, if the terminal station apparatus continues to detect reception levels for the time $T_2$ while it is ensured that the base station apparatus continuously transmits training signals for testing, the terminal station apparatus can, during that time, reliably detect a reception level when using an optimal directional beam of the terminal station apparatus for a directional beam selected by the base station apparatus.

At this time, the terminal station apparatus cannot recognize which transmission beam the base station apparatus has used. However, the terminal station apparatus only needs to determine a directional beam to be used for transmission and reception by itself, and does not need information on the base station apparatus.

In the above directional beam selection processing on the base station apparatus side, it is possible to select an optimal combination of directional beams from combinations of directional beams of $N_1 \times N_2$ patterns of the base station apparatus if the period during which the terminal station apparatus transmits training signals and the duration during which the base station apparatus detects reception levels of directional beams are each at least the period $T_1$ or more even when the base station apparatus and the terminal station apparatus are not completely synchronized.

Similarly, in the above directional beam selection processing on the terminal station apparatus side, it is possible to select an optimal directional beam for a directional beam of the base station apparatus from $N_2$ directional beams of the terminal station apparatus if the period during which the base station apparatus transmits training signals and the duration during which the terminal station apparatus detects reception levels of directional beams are each at least the period $T_2$ or more even when the base station apparatus and the terminal station apparatus are not completely synchronized.

As described above, continuing the processing for a long period with some allowance enables both the base station apparatus and the terminal station apparatus to search for an appropriate directional beam even when they are not synchronized.

In the processing of the base station apparatus to search for a directional beam, the period of directional beam switching does not necessarily need to be the period $T_2$ and may be a period equal to or longer than the period $T_2$ (for example, a period $T_3$). In this case, the processing may be performed regarding $N_2 \times$period $T_3$ as the period $T_1$.

In the above description, the case where the base station apparatus switches directional beams at intervals of a short period $T_0$ to transmit training signals and the terminal station apparatus switches directional beams at intervals of a relatively long period $T_2$ to receive training signals has been described. The purpose of this is to be able to cover all combinations of transmission and reception directional beams of $N_1 \times N_2$ types in total during the period $T_1$.

However, even when the terminal station apparatus switches directional beams at intervals of a short period $T_0$ to receive training signals and the base station apparatus switches directional beams at intervals of a relatively long period $N_1 \times T_0$ to transmit training signals, similarly, it is possible to cover all combinations of transmission and reception directional beams of $N_1 \times N_2$ types in total during the period $T_1$. Thus, performing the processing with any of these configurations can achieve equivalent effects.

Hereinafter, details of the above processing will be described with reference to the drawings.

First Embodiment

Hereinafter, a first embodiment of the present invention will be described.

Figures 3A, 3B:
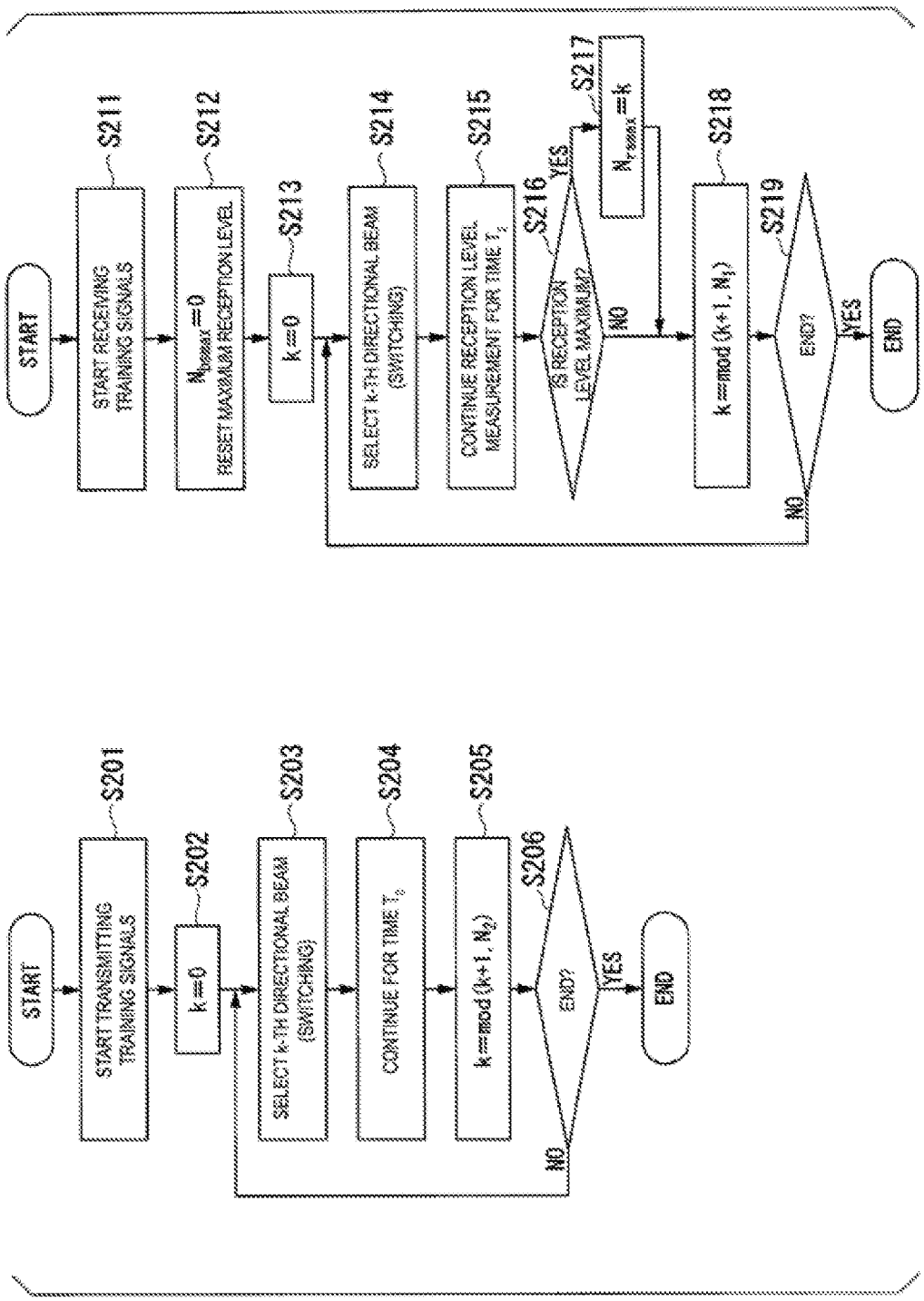
FIGS. 3A and 3B are flowcharts showing flows of directional beam selection processing of a base station apparatus according to the first embodiment of the present invention.

FIGS. 3A and 3B are flowcharts showing flows of directional beam selection processing of a base station apparatus (or a first wireless station apparatus) according to a first embodiment of the present invention.

In the processing shown in FIGS. 3A and 3B, the terminal station apparatus transmits training signals while switching directional beams and the base station apparatus receives the training signals while switching directional beams.
Therefore, respective signal processing of the wireless station apparatuses (the terminal station apparatus and the base station apparatus) is shown together. Here, FIG. 3A shows processing on the terminal station apparatus side. FIG. 3B shows processing on the base station apparatus side.

In the following description, it is assumed that triggers to start the processing of the terminal station apparatus and the processing of the base station apparatus are given by some means as described above. The respective processing of the terminal station apparatus and the base station apparatus starts in response to the triggers. In the following description, it is assumed that there are $N_1$ and $N_2$ options for directional beams of the terminal station apparatus and the base station apparatus and their identification numbers are 0 to $N_1-1$ and 0 to $N_2 \times 1$, respectively.

First, signal processing of the terminal station apparatus will be described. The terminal station apparatus starts processing upon receiving a processing start trigger. The terminal station apparatus starts transmitting predetermined training signals (step S201). Further, the terminal station apparatus resets a counter value k indicating the identification number of the directional beam to zero (step S202). The terminal station apparatus refers to the value of k to select a k-th directional beam and switches settings of the directional beam (step S203).

In the case of forming directivity using analog processing, this process is realized, for example, by setting the values of phase shifters mounted on a large number of antenna elements to values corresponding to the directional beam. In the case of forming directivity using digital processing, this process is realized, for example, by switching weight values by which transmission signals from the antenna elements are multiplied to values corresponding to the directional beam.

Thereafter, the terminal station apparatus continues the above processing for the time $T_0$ (step S204). Further, the terminal station apparatus adds 1 to k and obtains a remainder after dividing the resulting k by $N_2$ to determine the identification number of a next directional beam to be switched to (step S205).

Thereafter, the terminal station apparatus determines whether or not a processing end trigger has been given. If the end trigger has been given (Yes in step S206), the terminal station apparatus terminates the processing. If the end trigger has not been given (No in step S206), the terminal station apparatus continues the above processing (that is, the processes of steps S203 to S205). Here, it is assumed that the end trigger is given at a timing at which it can be confirmed that the above processing has continued for at least the time $T_2$.

Next, signal processing of the base station apparatus will be described. The base station apparatus starts processing upon receiving a processing start trigger. The base station apparatus starts receiving predetermined training signals (step S211). Further, the base station apparatus resets the value of a maximum reception level and resets $N_{bsmax}$, which is a memory value for storing the identification number of the directional beam of the maximum reception level, to zero (step S212). Also, the base station apparatus resets k, which is a counter value indicating the identification number of the directional beam, to zero (step S213). The base station apparatus refers to the value of k to select a k-th directional beam and switches settings of the directional beam (step S214).

In the case of forming directivity using analog processing, this process is realized, for example, by setting the values of phase shifters mounted on a large number of antenna elements to values corresponding to the directional beam. In the case of forming directivity using digital processing, this process is realized, for example, by switching weight values by which transmission signals from the antenna elements are multiplied to values corresponding to the directional beam.

Thereafter, the base station apparatus continues measuring the reception level for the time $T_2$ (step S215).
In measurement of the reception level during this time, the base station apparatus determines whether or not the maximum reception level detected so far has been updated.

If the maximum value of the reception level has been updated (Yes in step S216), the base station apparatus substitutes the identification number k of the directional beam at that time into the value of $N_{bsmax}$ (step S217) and then adds 1 to k and obtains a remainder after dividing the resulting k by $N_2$ to determine the identification number of a next directional beam to be switched to (step S218).

If the maximum value of the reception level has not been updated (No in step S216), the base station apparatus adds 1 to k and obtains a remainder after dividing the resulting k by $N_2$ to determine the identification number of a next directional beam to be switched to (step S218).

Thereafter, the base station apparatus determines whether or not a processing end trigger has been given. If the end trigger has been given (Yes in step S219), the base station apparatus terminates the processing. If the end trigger has not been given (No in step S219), the base station apparatus continues the above processing (that is, the processes of steps S214 to S219). Here, it is assumed that the end trigger is given at a timing at which it can be confirmed that the above processing has continued for at least the time $T_1$.

Through the above processing, the base station apparatus performs directional beam selection.

Setting of triggers to start the processing is performed, for example, in the order of 1) starting the processing of the terminal station apparatus, 2) starting the processing of the base station apparatus, 3) ending the processing of the base station apparatus, and 4) ending the processing of the terminal station apparatus. Here, it is only required that the period from the start of 2) to the end of 3) be at least the period $T_1$ or more. Therefore, the configuration may be such that the triggers are set to satisfy such conditions through some wireless communication function (or some communication means provided by an installer). Alternatively, the triggers may be set to satisfy such conditions through manual operations.

Figure 4B:
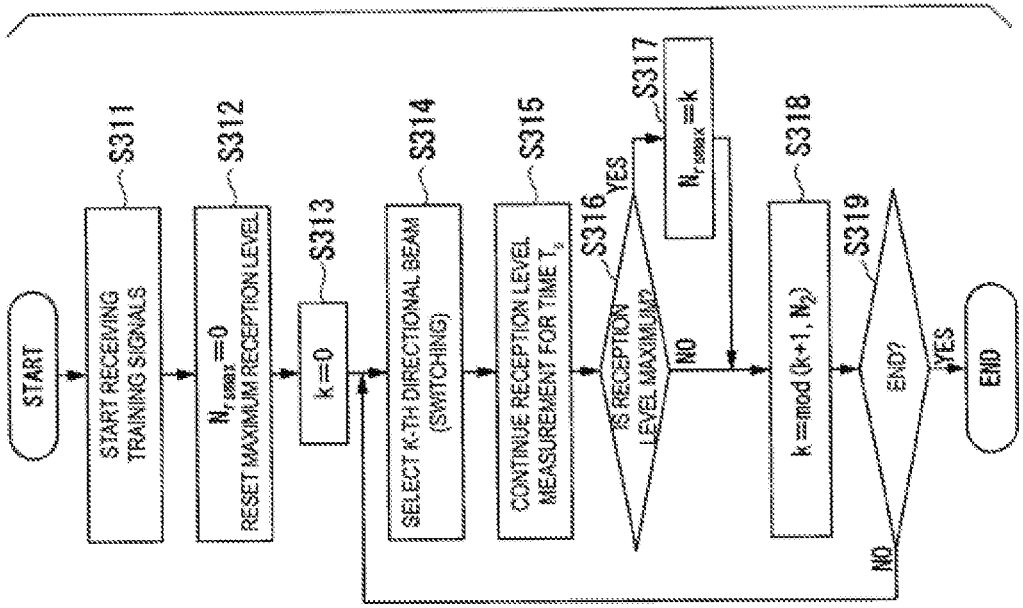
FIGS. 4A and 4B are flowcharts showing flows of directional beam selection processing of a terminal station apparatus according to the first embodiment of the present invention.
Figure 4A:
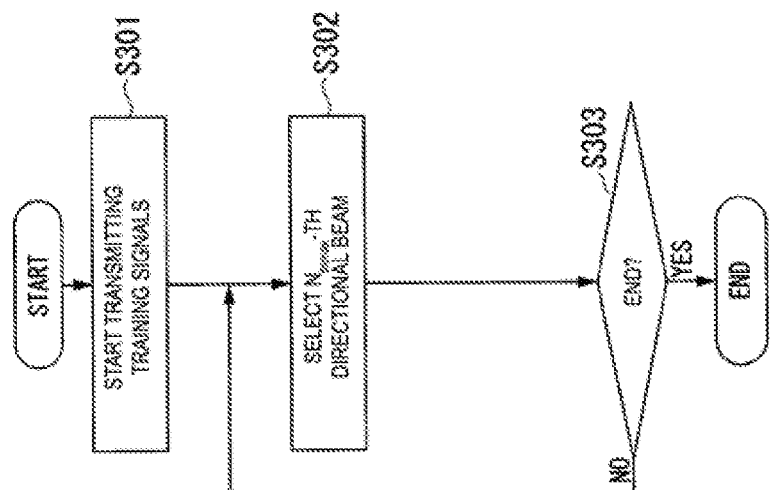

FIGS. 4A and 4B are flowcharts showing flows of directional beam selection processing of the terminal station apparatus (or a second wireless station apparatus) according to the first embodiment of the present invention.

In the processing shown in FIGS. 4A and 4B, the base station apparatus transmits training signals with the fixed directional beam and the terminal station apparatus receives the training signals while switching directional beams. Therefore, respective signal processing of the wireless station apparatuses (the base station apparatus and the terminal station apparatus) is shown together. Here, FIG. 4A shows processing on the base station apparatus side. FIG. 4B shows processing on the terminal station apparatus side.

It is assumed that triggers to start the processing of the base station apparatus and the processing of the terminal station apparatus are given by some means as described above. The respective processing of the base station apparatus and the terminal station apparatus starts in response to the triggers. In the following description, it is assumed that there are $N_2$ options for directional beams of the terminal station apparatus and their identification numbers are 0 to $N_2-1$.

First, signal processing of the base station apparatus will be described. The base station apparatus starts processing upon receiving a processing start trigger. The base station apparatus starts transmitting predetermined training signals (step S301). Further, the base station apparatus selects the $N_{bsmax}$-th directional beam which is a directional beam with the maximum value of the reception level selected in the above processing (step S302).

In the case of forming directivity using analog processing, this process is realized, for example, by setting the values of phase shifters mounted on a large number of antenna elements to values corresponding to the directional beam. In the case of forming directivity using digital processing, this process is realized, for example, by switching weight values by which transmission signals from the antenna elements are multiplied to values corresponding to the directional beam.

Thereafter, the base station apparatus determines whether or not a processing end trigger has been given at predetermined periods while continuing the above signal processing. If the end trigger has been given (Yes in step S303), the base station apparatus terminates the processing. If the end trigger has not been given (No in step S303), the base station apparatus continues the above processing (that is, the process of step S302).

Next, signal processing of the terminal station apparatus will be described. The terminal station apparatus starts processing upon receiving a processing start trigger. The terminal station apparatus starts receiving predetermined training signals (step S311). Further, the terminal station apparatus resets the value of a maximum reception level and resets $N_{rsmax}$, which is a memory value for storing the identification number of the directional beam of the maximum reception level, to zero (step S312). Also, the terminal station apparatus resets k, which is a counter value indicating the identification number of the directional beam, to zero (step S313). The terminal station apparatus refers to the value of k to select a k-th directional beam and switches settings of the directional beam (step S314).

In the case of forming directivity using analog processing, this process is realized, for example, by setting the values of phase shifters mounted on a large number of antenna elements to values corresponding to the directional beam. In the case of forming directivity using digital processing, this process is realized, for example, by switching weight values by which transmission signals from the antenna elements are multiplied to values corresponding to the directional beam.

Thereafter, the terminal station apparatus continues measuring the reception level for the time $T_0$ (step S315). In measurement of the reception level during this time, the terminal station apparatus determines whether or not the maximum reception level detected so far has been updated.

If the maximum value of the reception level has been updated (Yes in step S316), the terminal station apparatus substitutes the identification number k of the directional beam at that time into the value of $N_{rsmax}$ (step S317) and then adds 1 to k and obtains a remainder after dividing the resulting k by $N_2$ to determine the identification number of a next directional beam to be switched to (step S318).

If the maximum value of the reception level has not been updated (No in step S316), the terminal station apparatus adds 1 to k and obtains a remainder after dividing the resulting k by $N_2$ to determine the identification number of a next directional beam to be switched to (step S318).

Thereafter, the terminal station apparatus determines whether or not a processing end trigger has been given. If the end trigger has been given (Yes in step S319), the terminal station apparatus terminates the processing. If the end trigger has not been given (No in step S319), the terminal station apparatus continues the above processing (that is, the processes of steps S314 to S318).

Through the above processing, the terminal station apparatus performs directional beam selection.

Setting of triggers to start the processing is performed, for example, in the order of 5) starting the processing of the base station apparatus, 6) starting the processing of the terminal station apparatus, 7) ending the processing of the terminal station apparatus, and 8) ending the processing of the base station apparatus. Here, it is only required that the period from the start of 6) to the end of 7) be at least the period $T_2$ or more. Therefore, the configuration may be such that the triggers are set to satisfy such conditions through some wireless communication function (or some communication means provided by an installer). Alternatively, the triggers may be set to satisfy such conditions through manual operations.

The processing of 5) is performed subsequent to the processing of 4). Therefore, the configuration may be such that the processing shown in FIG. 4A starts subsequent to the processing shown in FIG. 3B.

In the above description, the period $T_0$ is a predetermined period that is a double or more of the time required to detect a reception level. Here, in each of the process of step S205 and the process of step S315, the reception level is measured at predetermined time intervals while the maximum value of the reception level detected with the same directional beam selected is managed. In each of the processes of next steps S206 and S316, the maximum value of the reception level is compared with the maximum value so far.

The above processing allows each of the base station apparatus and the terminal station apparatus to independently select an optimal directional beam by providing appropriate triggers while the base station apparatus and the terminal station apparatus are not synchronized.

The configuration of the above embodiment is such that the base station apparatus switches directional beams at intervals of a short period $T_0$ to transmit training signals and the terminal station apparatus switches directional beams at intervals of a relatively long period $T_2$ to receive training signals. The purpose of this is to be able to cover all combinations of transmission and reception directional beams of $N_1 \times N_2$ types in total during the period $T_1$ as described above.

However, even when the terminal station apparatus switches directional beams at intervals of a short period $T_0$ to receive training signals and the base station apparatus switches directional beams at intervals of a relatively long period $N_1 \times T_0$ to transmit training signals as described above, similarly, it is possible to cover all combinations of transmission and reception directional beams of $N_1 \times N_2$ types in total during the period $T_1$. Thus, performing the processing with any of these configurations can achieve equivalent effects.

Second Embodiment

Hereinafter, a second embodiment of the present invention will be described.

The configuration of the first embodiment described above is such that a directional beam having the highest reception level during a series of processes is selected. However, with this configuration, if a strong interference wave instantaneously arrives for some reason, there is a possibility that a directional beam in the arrival direction of the interference wave may be selected.

As an example of avoiding the above situation, the second embodiment described below provides a configuration such that reception processing is performed over a plurality of cycles and a directional beam having the maximum reception level is counted up in each cycle and a directional beam, which has the highest count of maximum reception levels until the processing is terminated, is selected.

Figure 5:
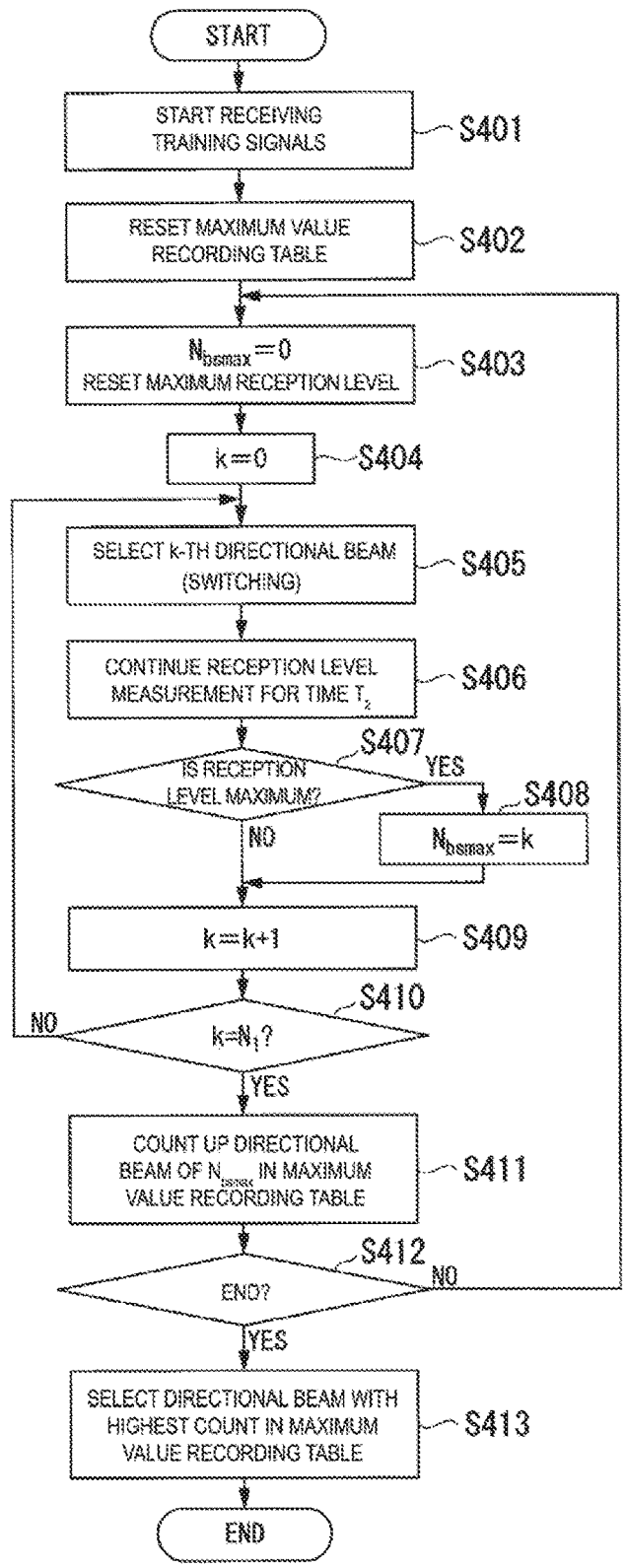
FIG. 5 is a flowchart showing a flow of directional beam selection processing of a base station apparatus according to a second embodiment of the present invention.

FIG. 5 is a flowchart showing a flow of directional beam selection processing of the base station apparatus (or the first wireless station apparatus) according to the second embodiment of the present invention. The difference between processing based on the flowcharts shown in FIGS. 3A and 3B and processing based on the flowchart shown in FIG. 5 is only processing on the base station apparatus side. Thus, the processing on the terminal station apparatus side is not shown in FIG. 5.

The process of step S211 in the flowchart shown in FIG. 3B and the process of step S401 shown in FIG. 5 have the same processing details. Further, the processes of steps S212 to S217 in the flowchart shown in FIG. 3B and the processes of steps S403 to S408 shown in FIG. 5 have the same processing details.

Further, the process of step S409 in the flowchart shown in FIG. 5 has processing details in common with the process of step S218 in the flowchart shown in FIG. 3B. However, while the remainder obtained by dividing the counter value k by $N_1$ is set as a new k in the process of step S218 in FIG. 3B, the division is actually unnecessary in the process of step S409 in FIG. 5 because this avoids k from being $N_1$ or more using conditional determination. Therefore, "k=k+1" is shown in FIG. 5.

Such processing blocks are repeated a plurality of times in the flowchart shown in FIG. 5. Specifically, upon starting receiving training signals (step S401), the base station apparatus resets a maximum value recording table (step S402). Further, the base station apparatus resets the value of the maximum reception level and resets $N_{bsmax}$, which is a memory value for storing the identification number of the directional beam of the maximum reception level, to zero (step S403).

Thereafter, the base station apparatus repeatedly performs the processes from step S403 to step S409. Thereafter, the base station apparatus determines whether or not the value of the counter value k is $N_1$.

If the value of the counter value k is not equal to $N_1$ (that is, if one cycle of directional beams is not completed) (No in step S410), the base station apparatus continues the above processing (that is, the processes of steps S405 to S410).

If the value of the counter value k is equal to $N_1$ (that is, if one cycle of directional beams is completed) (Yes in step S410), the base station apparatus counts up a corresponding directional beam having maximum reception levels in cycles in the maximum value recording table (step S411). Thereafter, the base station apparatus determines whether or not a processing end trigger has been given.

If the end trigger has not been given (No in step S412), the base station apparatus continues the above processing (that is, the processes of steps S403 to S411). If the end trigger has been given (Yes in step S412), the base station apparatus refers to the maximum value recording table and selects a directional beam with the highest count (step S413). Thereafter, the base station apparatus terminates the processing.

Figure 6:
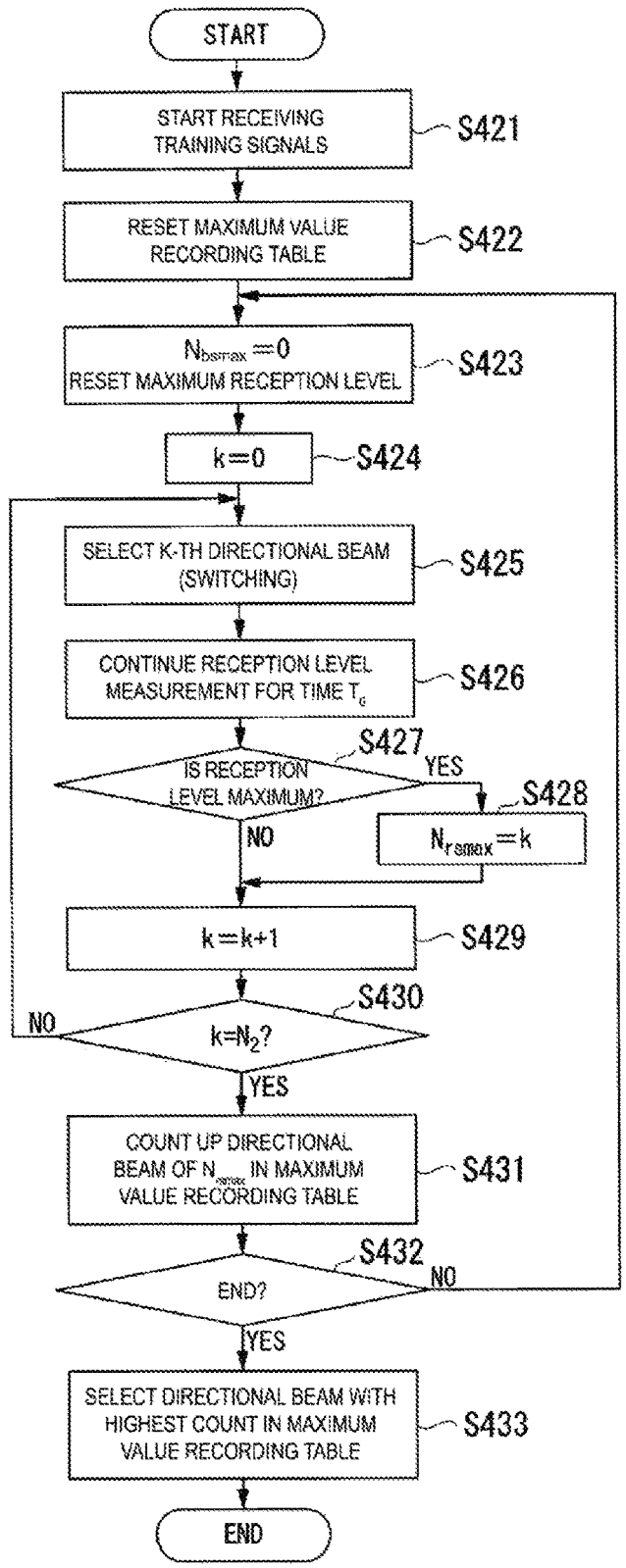
FIG. 6 is a flowchart showing a flow of directional beam selection processing of a terminal station apparatus according to the second embodiment of the present invention.

FIG. 6 is a flowchart showing a flow of directional beam selection processing of the terminal station apparatus (or the second wireless station apparatus) according to the second embodiment of the present invention. The difference between processing based on the flowcharts shown in FIGS. 4A and 4B and processing based on the flowchart shown in FIG. 6 is only processing on the terminal station apparatus side. Thus, the processing on the base station apparatus side is not shown in FIG. 6.

The process of step S311 in the flowchart shown in FIG. 4B and the process of step S421 shown in FIG. 6 have the same processing details. Further, the processes of steps S312 to S317 in the flowchart shown in FIG. 4B and the processes of steps S423 to S428 shown in FIG. 6 have the same processing details.

Further, the process of step S429 in the flowchart shown in FIG. 6 has processing details in common with the process of step S318 in the flowchart shown in FIG. 4B. However, while the remainder obtained by dividing the counter value k by $N_2$ is set as a new k in the process of step S318 in FIG. 4B, the division is actually unnecessary in the process of step S409 in FIG. 6 because this avoids k from being $N_2$ or more using conditional determination. Therefore, "k=k+1" is shown in FIG. 5.

Such processing blocks are repeated a plurality of times in the flowchart shown in FIG. 6. Specifically, upon starting receiving training signals (step S421), the terminal station apparatus resets a maximum value recording table (step S422). Further, the terminal station apparatus resets the value of the maximum reception level and resets $N_{bsmax}$, which is a memory value for storing the identification number of the directional beam of the maximum reception level, to zero (step S423).

Thereafter, the terminal station apparatus repeatedly performs the processes from step S423 to step S429. Thereafter, the terminal station apparatus determines whether or not the value of the counter value k is $N_2$.

If the value of the counter value k is not equal to $N_2$ (that is, if one cycle of directional beams is not completed) (No in step S430), the terminal station apparatus continues the above processing (that is, the processes of steps S425 to S429).

If the value of the counter value k is equal to $N_2$ (that is, if one cycle of directional beams is completed) (Yes in step S430), the terminal station apparatus counts up a corresponding directional beam having maximum reception levels in cycles in the maximum value recording table (step S431). Thereafter, the terminal station apparatus determines whether or not a processing end trigger has been given.

If the end trigger has not been given (No in step S432), the terminal station apparatus continues the above processing (that is, the processes of steps S423 to S431). If the end trigger has been given (Yes in step S432), the terminal station apparatus refers to the maximum value recording table and selects a directional beam with the highest count (step S433). Thereafter, the terminal station apparatus terminates the processing.

Processes other than those described above are the same as those of the first embodiment and a description thereof is omitted.

Third Embodiment

Hereinafter, a third embodiment of the present invention will be described.

The configuration of the second embodiment described above is such that the number of times the reception level is the maximum is counted up in each cycle of directional beam switching. However, a configuration may also be provided such that the maximum reception level is recorded in each cycle and a directional beam is selected based on the magnitude of an average of its recorded values.

When this configuration is employed, the configuration may also be such that directional beams whose reception levels have never been the maximum are excluded from the calculation of the average value of reception levels.

That is, the configuration may be such that average received power is calculated for directional beams that have been selected at least once or more.

The configuration requires not only a process of recording the number of times the reception level is the maximum in the maximum value recording table, but also a new process of recording the values of maximum reception levels. This additional process may be performed together with steps S402 and S411 shown in FIG. 5 and with steps S422 and S431 shown in FIG. 6.

The configuration may also be such that the average values of the reception levels are calculated after a predetermined number of values counted from the lowest and a predetermined number of values counted from the highest among the recorded values of maximum reception levels of directional beams are excluded from those used for calculation of the average values. In this case, the configuration may be such that a directional beam is excluded from those used for evaluation of average reception levels when the number of values of the directional beam that have been excluded from those used for calculation of the average values is greater than a count value. The above process of selecting a directional beam based on the process of calculating average reception levels may be performed instead of step S413 shown in FIG. 5 and step S433 shown in FIG. 6.

Other Supplementary Descriptions

In the configuration of the above embodiment, it is noted that there is a high possibility that a desired training signal has not been received if its reception level is equal to or less than a predetermined value in the process of counting up the number of times each directional beam has the maximum reception level. Therefore, the count-up may not be performed when the reception level is equal to or less than the predetermined value.

The configuration in the above embodiment is such that first a training signal is transmitted from the terminal station apparatus and a directional beam on the base station apparatus side is determined, and then a directional beam on the terminal station apparatus side is determined. However, the order of determining directional beams may be reversed. That is, the configuration may be such that first a training signal is transmitted from the base station apparatus and a directional beam on the terminal station apparatus side is determined, and then a directional beam on the base station apparatus side is determined.

Basically, one of the base station and the terminal station switches directional beams at intervals of a short period and the other switches directional beams at intervals of a long period to ensure that an optimal combination of directional beams is included at least once in a long period. Detecting each reception level at least once within such a combined duration makes it possible to select a directional beam having the maximum reception level.

In the configuration in the above embodiment, the base station apparatus switches directional beams at intervals of $T_2$ shown in Formula (1). If directional beams are switched at intervals of longer than $T_2$, directional beam switching over the period shown in Formula (2) may be performed, assuming that intervals of longer than $T_2$ are regarded as intervals of new $T_2$. This enables detection of reception levels including those of an optimal combination of directional beams in entire search with the same processing.

Functional Configuration of Wireless Communication System

Hereinafter, a most typical basic configuration of a wireless communication system in the above embodiment will be described.

Figure 7:
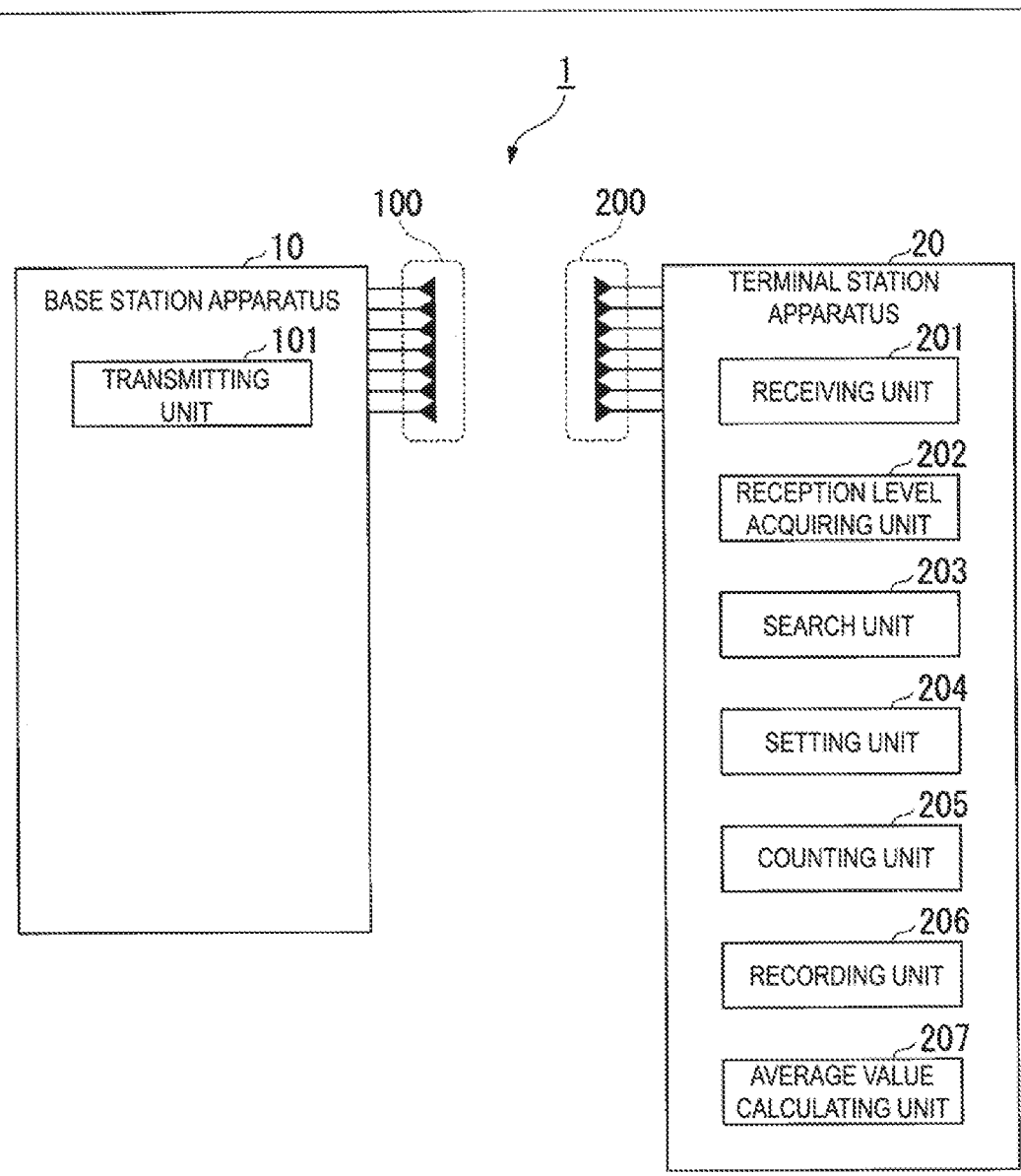
FIG. 7 is a block diagram showing a functional configuration of a wireless communication system according to an embodiment of the present invention.

FIG. 7 is a block diagram showing a functional configuration of a wireless communication system 1 according to an embodiment of the present invention.

As shown, the wireless communication system 1 includes a base station apparatus 10 and a terminal station apparatus 20. The base station apparatus 10 includes an antenna element group 100 including a plurality of antenna elements. Similarly, the terminal station apparatus 20 includes an antenna element group 200 including a plurality of antenna elements. The wireless communication system 1 is a system which allows each of the base station apparatus 10 and the terminal station apparatus 20 to perform directivity forming using a plurality of antenna elements.

The base station apparatus 10 can form $N_1$ ($N_1$ is an integer of 2 or more) types of directional beams using a plurality of antenna elements (first antenna elements). The terminal station apparatus can form $N_2$ ($N_2$ is an integer of 2 or more) types of directional beams using a plurality of antenna elements (second antenna elements).

Hereinafter, it is assumed that a predetermined period that is a double or more of the time required to detect a reception level in each of the base station apparatus 10 and the terminal station apparatus 20 is $T_0$, $T_2 = N_2 \times T_0$, and $T_1 = N_1 \times T_2$.

The base station apparatus 10 (the first wireless station apparatus) includes a transmitting unit 101.

The transmitting unit 101 sequentially switches the $N_1$ types of directional beams at intervals of the period $T_2$ and transmits training signals for reception level detection while performing switching with the same directional beam switching pattern maintained over the period $T_1$.

The terminal station apparatus 20 (the second wireless station apparatus) includes a receiving unit 201, a reception level acquiring unit 202, a search unit 203, a setting unit 204, a counting unit 205, a recording unit 206, and an average value calculating unit 207.

The receiving unit 201 sequentially switches the $N_2$ types of directional beams at intervals of the period $T_0$ and receives training signals for reception level detection over at least the period $T_1$ or more while performing switching with the same directional beam switching pattern maintained over the period $T_2$.

The reception level acquiring unit 202 acquires the reception levels of the received training signals.

The search unit 203 searches for the identification number of a directional beam having the highest reception level in reception level information acquired over a predetermined period.

The setting unit 204 sets the directional beam having the highest reception level based on the searched identification number as a directional beam used at the times of transmission and reception.

Alternatively, the receiving unit 201 receives training signals for reception level detection over a period that is a double or more of the period $T_1$.

In this case, the search unit 203 searches for the identification number of a directional beam having the highest reception level in reception level information acquired in the period $T_1$.

In this case, the counting unit 205 counts, for each directional beam, the number of times being selected as a directional beam having the highest reception level.

In this case, the search unit 203 searches for a directional beam having the maximum count number among the count numbers of directional beams.

In this case, the setting unit 204 sets the searched directional beam having the maximum count number as a directional beam used at the times of transmission and reception.

Alternatively, the receiving unit 201 receives training signals for reception level detection over a period that is a double or more of the period $T_1$.

In this case, the recording unit 206 records, for each directional beam used for reception, all or part of reception level information that the search unit 203 has acquired over a predetermined period.

In this case, the average value calculating unit 207 calculates an average value of reception levels recorded by the recording unit 206 for each directional beam.

In this case, the search unit 203 searches for the identification number of a directional beam that has the highest reception level among the average values of reception levels calculated by the average value calculating unit 207.

In this case, the setting unit 204 sets the searched directional beam having the maximum average value of reception levels as a directional beam used at the times of transmission and reception.

As described above, it is required in the related art that the U plane and the C plane operate in a high frequency band for directional beam selection in a wireless entrance system in which it is assumed that a high frequency band is used. However, the base station apparatus and the terminal station apparatus are not synchronized at the start of communication. At this time, each of the base station apparatus and the terminal station apparatus cannot recognize at which timing and in which direction the other station has transmitted a beam. Further, there is a problem that a directional beam cannot be optimally selected because the control line (C plane) has not been set. Even in such a situation, it is necessary to search for an optimal combination of directional beams with a simpler configuration.

On the other hand, the wireless communication system 1 according to the embodiments of the present invention features that directional beams are switched at intervals of a predetermined period that is a double or more of the time required to detect a reception level in each of the base station apparatus and the terminal station apparatus and an optical directional beam is searched for using a line secured between the base station apparatus and the terminal station apparatus.

Thereby, the wireless communication system 1 according to the embodiment of the present invention can search for optimal directional beams even between apparatuses that are not synchronized.

Here, the "predetermined period that is a double or more of the time required to detect a reception level" is intended to ensure that, when a reception level can be detected by continuing the processing of reception level detection for the predetermined period $T_0$, the period $T_0$ is always included within a period $2T_0$ regardless of the timing at which the period $T_0$ starts as long as a signal continues for twice the period $T_0$. If level detection is performed at a rate of once in a period $T_0'$ sufficiently longer than a period $T_0$ while a reception level can be detected in the period $T_0$, the "predetermined period that is a double or more of the time required to detect a reception level" is to be set to the period $T_0$.

Although embodiments of the present invention have been described above with reference to the drawings, it is apparent that the above embodiments are merely examples of the present invention and the present invention is not limited to the above embodiments. Therefore, additions, omissions, replacements, and other changes may be made to the components without departing from the technical spirit and scope of the present invention.

The wireless communication system 1 according to the above embodiments may be realized by a computer. In this case, a program for realizing the functions of wireless communication system 1 may be recorded on a computer readable recording medium and the functions may then be realized by causing a computer system to read and execute the program recorded on the recording medium. The "computer system" referred to here includes an OS or hardware such as peripheral devices. The "computer readable recording medium" refers to a portable medium such as a flexible disk, a magneto-optical disk, a ROM, or a CD-ROM, a storage device such as a hard disk provided in the computer system, or the like. The "computer readable recording medium" may include something that dynamically holds a program for a short time, like a communication wire in the case in which the program is transmitted via a communication line such as a telephone line or a network such as the Internet, or may something that holds a program for a certain period of time, like an internal volatile memory of a computer system serving as a server or a client. The program may be one for realizing some of the above-described functions or one which can realize the above-described functions in combination with a program already recorded in the computer system or may be one realized using a programmable logic device such as a field programmable gate array (FPGA).

REFERENCE SIGNS LIST

1 Wireless communication system
10 Base station apparatus
20 Terminal station apparatus
100 Antenna element group
101 Transmitting unit
200 Antenna element group
201 Receiving unit
202 Reception level acquiring unit
203 Search unit
204 Setting unit
205 Counting unit
206 Recording unit
207 Average value calculating unit

The invention claimed is:

1. A wireless communication method for a wireless communication system including a first wireless station apparatus having a plurality of antenna elements and a second wireless station apparatus having a plurality of antenna elements and allows the first wireless station apparatus and the second wireless station apparatus to perform directivity forming using the plurality of antenna elements,
  the first wireless station apparatus being able to form $N_1$ types of directional beams using the plurality of antenna elements (where $N_1$ is an integer of 2 or more), and
  the second wireless station apparatus being able to form $N_2$ types of directional beams using the plurality of antenna elements (where $N_2$ is an integer of 2 or more),
  wherein, for $T_1$ and $T_2$ such that $T_2=N_2 \times T_0$ and $T_1=N_1 \times T_2$ with $T_0$ being a predetermined period that is a double or more of a time required to detect a reception level in the first wireless station apparatus and the second wireless station apparatus, the methods includes,
  at the first wireless station apparatus, a transmitting step of sequentially switching $N_1$ types of directional beams at intervals of a period $T_2$ and transmitting training signals for reception level detection while performing switching with an identical directional beam switching pattern maintained over a period $T_1$, and
  at the second wireless station apparatus:
  a first receiving step of sequentially switching $N_2$ types of directional beams at intervals of a period $T_0$ and receiving training signals for reception level detection over at least the period $T_1$ or more while performing switching with an identical directional beam switching pattern maintained over the period $T_2$;
  a reception level acquiring step of acquiring reception levels of the received training signals;
  a first search step of searching for an identification number of a directional beam having a highest reception level in reception level information acquired over a predetermined period; and
  a first setting step of setting the directional beam having the highest reception level based on the searched identification number as a directional beam used at times of transmission and reception.

2. A wireless communication system comprising a first wireless station apparatus having a plurality of antenna elements and a second wireless station apparatus having a plurality of antenna elements and allows the first wireless station apparatus and the second wireless station apparatus to perform directivity forming using the plurality of antenna elements,
  the first wireless station apparatus being able to form $N_1$ types of directional beams using the plurality of antenna elements (where $N_1$ is an integer of 2 or more), and
  the second wireless station apparatus being able to form $N_2$ types of directional beams using the plurality of antenna elements (where $N_2$ is an integer of 2 or more),
  wherein, for $T_1$ and $T_2$ such that $T_2=N_2 \times T_0$ and $T_1=N_1 \times T_2$ with $T_0$ being a predetermined period that is a double or more of a time required to detect a reception level in the first wireless station apparatus and the second wireless station apparatus,
  the first wireless station apparatus includes a transmitting unit configured to sequentially switch $N_1$ types of directional beams at intervals of a period $T_2$ and transmit training signals for reception level detection while performing switching with an identical directional beam switching pattern maintained over a period $T_1$, and
  the second wireless station apparatus includes:
  a receiving unit configured to sequentially switch $N_2$ types of directional beams at intervals of a period $T_0$ and receive training signals for reception level detection over at least the period $T_1$ or more while performing switching with an identical directional beam switching pattern maintained over the period $T_2$;
  a reception level acquiring unit configured to acquire reception levels of the received training signals;
  a search unit configured to search for an identification number of a directional beam having a highest reception level in reception level information acquired over a predetermined period; and
  a setting unit configured to set the directional beam having the highest reception level based on the searched identification number as a directional beam used at times of transmission and reception.

3. A wireless station apparatus that is able to form $N_2$ types of directional beams using a plurality of second antenna elements (where $N_2$ is an integer of 2 or more) to perform directivity forming with another wireless station apparatus that is able to form $N_1$ types of directional beams using a plurality of first antenna elements (where $N_1$ is an integer of 2 or more), wherein, for $T_1$ and $T_2$ such that $T_2=N_2 \times T_0$ and $T_1=N_1 \times T_2$ with $T_0$ being a predetermined period that is a double or more of a time required to detect a reception level in the wireless station apparatus and the other wireless station apparatus, the wireless station apparatus comprises:
  a processor; and
  a storage medium having computer program instructions stored thereon, when executed by the processor, perform to:
  sequentially switch $N_2$ types of directional beams at intervals of a period $T_0$ and receive training signals for reception level detection over at least a period $T_1$ or more while performing switching with an identical directional beam switching pattern maintained over a period $T_2$;
  acquire reception levels of the received training signals;
  search for an identification number of a directional beam having a highest reception level in reception level information acquired over a predetermined period; and
  set the directional beam having the highest reception level based on the searched identification number as a directional beam used at times of transmission and reception.

* * * * *